DEVICE FOR PRODUCING THE VAPOR OF A CHEMICAL AGENT

Filed Sept. 11, 1945

INVENTOR
David E. Pearsall
BY Ernest D. Given
ATTORNEY

Patented Sept. 12, 1950

2,521,941

UNITED STATES PATENT OFFICE 2,521,941

DEVICE FOR PRODUCING THE VAPOR OF A CHEMICAL AGENT

David E. Pearsall, Avon, Conn., assignor to The Ensign-Bickford Company, Simsbury, Conn., a corporation of Connecticut Application September 11, 1945, Serial No. 615,601

12 Claims. (Cl. 21—111)

1

My present invention relates to a vapor producing device. More particularly, the invention relates to a vapor producing device which may be formed in continuous lengths, which burns at a definite rate and which releases a vapor, such as one which is toxic to insects, pests and the like, in controlled amounts. The device is for use in either closed or outdoor areas. An important feature is that the device comprises a cord or cord-like material coated or in intimate contact with compositions containing oxygen-sufficient combustible powders and vapor producing materials.

From a broad point of view the term vapor producing material, as used herein, is intended to include one or more compositions for insecticidal, fungicidal or other analogous purposes by means of which undesired living organisms—either animal or vegetable in nature—may be killed or otherwise eliminated. This term may also be defined as an active chemical agent which is capable of affecting living things. Due to the manner of use of this agent it must also be volatilizable as such, i. e. without such chemical change as will change and substantially negative its desired effect on living things.

In present methods of insect or pest extermination, the insecticides are applied in three forms viz: (1) as solids by dusting, (2) as liquids by spray, and (3) as gases by fumigating.

The subject of this invention is most closely related to the latter method of extermination, viz. fumigation by means of gases, but it has certain inherent differences and advantages over fumigation methods, and it is not subject to many of their disadvantages.

In fumigation methods, the gases are either produced in situ from the action of chemicals or are formed when volatilizable liquids held under pressure in heavy metal cylinders are released to the atmosphere. Thus an object of my invention is to replace the present cumbersome methods and equipment with a light, flexible and easily handled product. Also in fumigation methods, the action of the gas persists only as long as it is in contact with the object to be treated, which is usually for a number of hours and perhaps a day or two. With the cord of my invention, the active chemical agent, while released as a vapor, condenses to a certain degree and produces residual protection in addition to that given by the vapor. Further, the period of treatment for enclosed areas may be reduced to about 10 to 30 minutes depending upon the active chemical agent used and the dosage and time of exposure.

2

Other and more detailed objects of the present invention such as safety features etc. will become apparent from the following specification and appended claims when taken in connection with the accompanying drawings in which:

Basically, a toxic vapor producing cord according to the present invention comprises a cord-like structure having therein as one essential ingredient an oxygen-sufficient combustible material—that is, a material which does not depend on atmospheric oxygen for its combustion—such as one having a combustible ingredient or fuel and a combustion-sustaining ingredient or oxidizing agent. As a second essential ingredient, there is a material containing a toxic vapor producing agent.

A toxic vapor producing cord of my invention preferably comprises a central continuous combustible powder core in intimate combination with or in juxtaposition to a toxicant both of which are supported by and surrounded by textiles and waterproofings to produce a cord-like product which—depending upon its structure—may be similar in structure to safety fuses such as are described in U. S. Patents Nos. 1,907,863 and 2,102,024; or it may have a structure similar to ignition fuses such as are described in U. S. Patents Nos. 2,239,051 and 2,239,052; or it may have still other structures. It will thus be understood that this invention contemplates the production of toxic vapor, smoke, or aerosol producing cords in different structures and forms, and that all such products are included in the scope of this invention. The products comprise continuous lengths of cord or wire-like products, which are produced for the purpose of generating by heat and distributing by vaporization and smoke the volatilized active chemical compounds in measured dosages.

Figure 1:
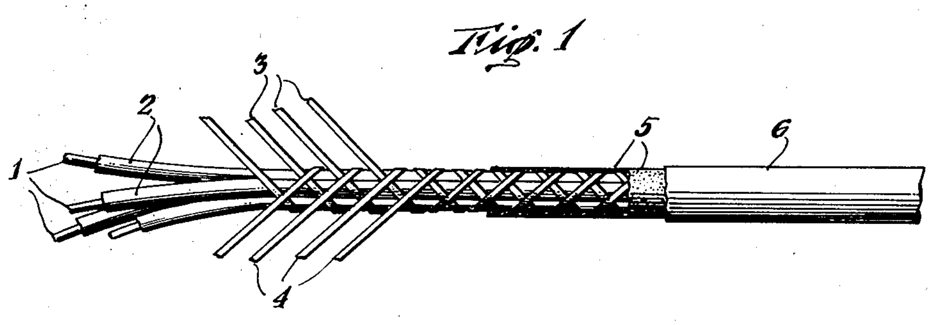
Figure 1 is a view partly in full and partly broken away showing the construction of a cord embodying the present invention.

What is at present a preferred form of this vapor producing cord is shown in Fig. 1 in the accompanying drawings. Referring to Fig. 1, the vapor producing cord may be said to consist of a flexible cord-like structure comprising a plurality of textile yarns or filaments 1 of the proper size and surface to permit satisfactory application thereto of powder paste coatings 2, which harden on drying and may contain both the combustible powder and the active chemical agent in combination with a suitable binder; or some of them may be coated with the combustible material and others with the toxic vapor producing material. The oxygen-sufficient combustible powder may comprise mealed black powder or the mealed modified black powder as described in U. S. Patents Nos. 2,072,719 and 2,072,720. However, nitrocellulose powders and thermite type compounds may also be used. By mealed powder, I refer to the powder in finely ground or dust form.

The binder may be a solvent solution of nitrocellulose or other cellulose ester or ether, which is combustible and does not act substantially as a deterrent to the burning of the powder. Other suitable natural and synthetic organic plastic and resinous materials may also be used as binders.

The toxic vapor producing compounds contemplated for use in accordance with the present invention comprise natural or synthetic substances having toxic or repellant properties toward insects and pests—or toward harmful fungi, which substances are solid under normal atmospheric conditions, have low vapor pressures and relatively high melting and boiling points. The substances must be vaporized and distributed without decomposition to an objectionable degree at the temperature of the burning zone of the cord. It is also of advantage if the substances are moisture resistant. Suitable organic insecticides that have been used include the synthetics 2,2 bis (para chloro phenyl) trichlorethane (DDT); the gamma isomer of benzene hexachloride (Gammexane); and the natural compounds pyrethrum, rotenone-bearing materials and nicotine or its compounds.

The coated filaments 1—2, made in any suitable manner and with a composition as hereinabove described, are then assembled in a group, as many as desired being included in such group, and are then bound together by winding one or more filaments of suitable material around the group of coated filaments 1—2 as shown in Fig. 1, wherein filaments 3 are wound in one direction and filaments 4 in the other, both in a helical manner giving the appearance of a tubular mesh-like fabric. Other types of binding may also be used, but it is important that the area of the coated cords covered by the binding filaments be small so as to expose a maximum of powder core. It is also contemplated that the toxicant may be omitted from all the central parallel strands and coated on the twisted binding filaments. In some structures, it is also of advantage to include at least one strand of wire along with the coated cords if it is desired to make the cord self-supporting to a greater degree. The filaments 3 and 4 may be of any suitable material, either natural or synthetic in nature, and may, for example, comprise conventional textile threads or yarns. These filaments may also be strips of paper or commercial synthetic plastic material, including thermoplastic and fusible materials as may be desired. The tubular mesh thus formed readily permits the escape of vaporized toxic material along with gaseous and aerosol products of combustion.

Figure 3:
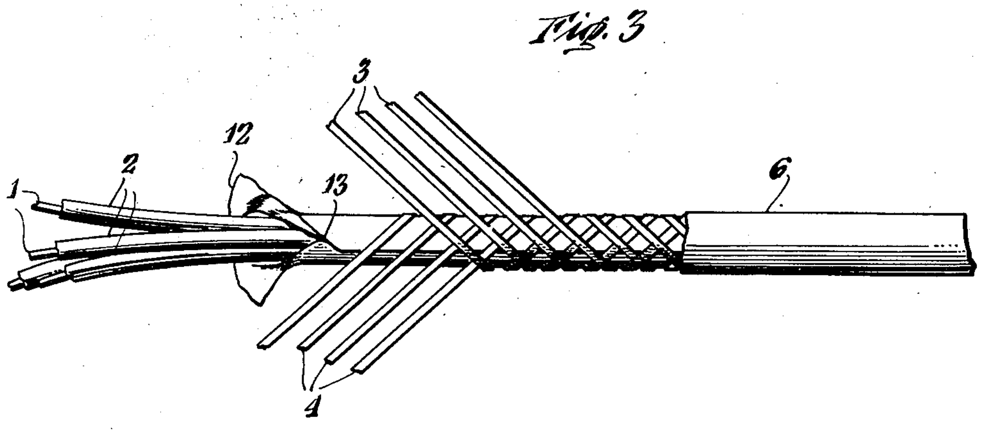
Fig. 3 is a view similar to Fig. 1 showing a further embodiment of the present invention.

The entire structure as thus formed is then preferably given a coating 5 of a suitable film-forming composition which has several important functions. In the first place, the coating 5 holds the structure together and reduces or prevents afterglow and charring of the cord after the powder has burned; and in the second place, the combination of the film-forming material with the filament material 3, 4 provides a barrier of determinable resistance which confines the gaseous materials evolved during the combustion until they have built up to a suitable pressure before allowing them to pass to the atmosphere, and thus controls to a certain extent the average size of the particles of the toxicant material. This is important in many uses to which the toxic vapor producing cord of my present invention is applicable. The coating may be of any suitable film-forming composition, such as the cellulose esters or ethers. The same purposes may also be accomplished by placing a coating 12 preferably formed of thermoplastic or other fusible material around the coated filaments 1—2 as specifically shown in Fig. 3. A practical way of forming this coating is to apply it as a tape, either wound helically or applied longitudinally in either case with overlapping edges as shown at 13, which may be sealed by the use of a suitable cement or the welding of the material of the tape if desired. A further coating 6 is then applied over the coating 5, which is preferably fusible at the temperatures attained as a result of and during the combustion of the powder. Such materials as the petroleum wax-ester gum compositions described in my prior Patent No. 1,968,907, granted August 7, 1934, have been found particularly suitable in this respect.

Figure 2:
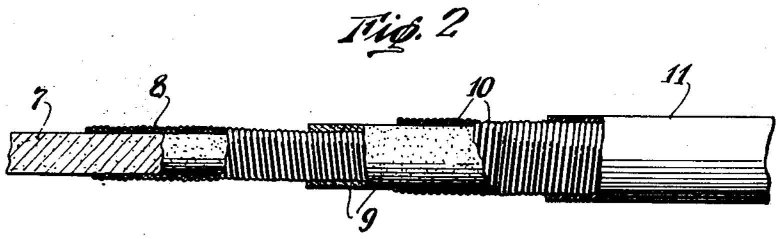
Fig. 2 is a similar view showing a modified form of cord in accordance with this invention.

A possible variant of the disclosure of Fig. 1, which is within the intended scope of my invention, is to provide a powder core which may be similar to the core structure shown in Fig. 1, including the coating filaments 1—2, or may be a core solely of powder with other externally applied material relied upon to give the necessary structural strength for a continuous length of cord similar to the structure of Fig. 2. This outer coating may be formed from a tape, either wound helically or extending longitudinally, and of a nature or so treated that the meeting edges or overlapping portions will in effect weld together to form a tubular enclosing body about the powder material. Such tape might, for example, be composed of a heat-fusible composition, of which many are known in the art.

Another possible variant of the present invention, which is illustrated as far as it may be in Fig. 1, is to employ as the coating 2 for the filaments 1 an oxygen-sufficient combustible powder as previously described and then to impregnate the filaments 3 or 4 or both of them with a vapor producing agent, which is volatilized by the heat generated upon the combustion of the powder. Structurally the device so formed may be of the same construction previously disclosed for Fig. 1, so that no further illustration thereof is given in the drawings. However, the difference from the Fig. 1 disclosure above lies in that the toxic vapor producing agent is not admixed with the powder 2, but is used by impregnating the helically wound filaments 3 and/or 4.

Another preferred construction is shown in Fig. 2 and comprises a core of an oxygen-sufficient combustible powder, which may be of the composition above set forth, and may be in granular or dust form, this core being indicated at 7. The active chemical agent may be intimately mixed with the combustible powder of the core 7 or may be disposed as hereinafter described, separated by an annular layer comprising a textile or paper covering 8 from the core 7, the active chemical agent being formed into an annular layer 9. This form is preferred in some instances, as the vapor producing material may, when used in this manner, be subjected to less heat than if it were directly in contact with the burning medium by being intimately mixed therewith. The layer 9 is in turn surrounded by a layer of textile or other material 10, which is pervious to the passage of gases or vapors upon the burning of the cord. The whole is coated with a coating of a water or moisture-resistant character indicated at 11, which may be similar to the coating 6 above set forth.

By incorporating predetermined quantities of vapor producing material per unit of length of the cord, definite concentrations of the vapor will be liberated at a rate that can be controlled in part by the burning time of the cord. In most instances, the higher the concentration of a vapor produced, the more efficient will be its effect. Therefore, it is important that the agent be rapidly vaporized and thoroughly and completely dispersed. Tests have shown that for practical considerations of use, the burning rate of the cord of this invention should preferably be not less than about 20 seconds per foot and not faster than about 2 seconds per foot.

The concentration of the vapor produced thus depends upon the following factors: (1) the amount of vapor producing agent per unit of length of cord; (2) the physical properties of the active agent; (3) the temperature and rate of burning, and hence vaporization rate of the active agent; (4) the rate of melting or fusing of the waterproof coating, permitting release of the vapor; (5) the amount of dilution of the active agent with the remaining inert gas and smoke generated from the burning powder and other material of which the cord is composed, and which may serve in part as a carrier for the active agent; and (6) the atmospheric conditions prevalent at the time of burning the cord.

It is important, from a safety standpoint, that the fire hazard of this cord be reduced as nearly as possible to a minimum. This may be controlled to a large extent by the type of structure and choice of materials of which the vapor producing cord is made, and also the burning characteristics of the combustible powder. It is contemplated that non-combustible materials, such as asbestos or glass fiber yarns, may be used at least in part, for example as the filaments 1 or as some of the materials such as are shown at 3 and 4 in Fig. 1, and/or at 8 or 10 in Fig. 2. On the other hand, when such textile materials as cotton yarns are used, they may be fireproofed by suitable materials such as alkyl ammonium phosphates, the sulfamates or other materials well known in the art. It is preferred that non-combustible or relatively slow-burning materials having high fire points should be used for the outside water-resistent coatings.

The vapor producing cord of my present invention may be used in various ways, depending upon the results desired. In general, when operations are to be carried out in the open, they should be done when the wind velocity is low and when the temperature is neither too high nor too low. Temperatures of 65° to 75° F. that exist in the early morning and late evenings of the growing season are very suitable as below 65° F. many of the insects are dormant and not easily killed, while at temperatures above 75° F. the toxicants are subject to more rapid dispersion by convection currents.

For treating plants in a garden or field, the cord of my present invention may be disposed between certain at least of the rows of plants, so as to produce a substantially uniform concentration of the active agent when the cord is burned. By varying the connections of the cords used and the number of places substantially simultaneously ignited, the time for building up a desired concentration may be controlled. When used in a suitable manner, a desired relatively high concentration of the active agent may be built up in a given area in a relatively short time, so as to produce the desired high effect.

An important use of the novel cord according to my invention is in the application and distribution of a toxic agent in the inside of a building or a part thereof. Under certain circumstances it is dangerous for human beings to carry on the present type fumigating operations, as for example, when hydrocyanic acid gas is being used. With a toxic vapor producing cord constructed in accordance with my present invention, the cord may be placed and suitably ignited from a safe point outside the building.

Another use of cord according to the present invention is in exterminating undesired living organisms in enclosed areas used for growing plants, such as greenhouses, and also for killing undesired insects or other living organisms in houses or public buildings. In addition, the cord of my present invention may be strung around the trunks or branches of trees for killing insects. Burrowing pests, such as moles, gophers, etc., may be dealt with by pushing lengths of the cord into their burrowings and igniting it. All uses as generally set forth, and others which will occur to those skilled in the art, are to be considered within the purview of this invention.

While there are herein shown and described but a few principal forms, which are those at present preferred, for the construction of a cord according to the present invention, I do not wish to be limited particularly to these specific forms, but contemplate that certain changes may be made therein in accordance with known practices and also such other variations as may occur to those skilled in the art. I do not wish to be limited, therefore, except by the scope of the appended claims, which are to be construed validly as broadly as the state of the prior art permits.

What is claimed is:

1. A vapor producing device of continuous length, comprising an oxygen-sufficient combustible powder, an active organic chemical agent which is capable of affecting living things and which is volatilizable as such by heat, and a continuous supporting means extending throughout the length of the device for holding said powder and said chemical agent in the form of a cord, said device having predetermined amounts of said chemical agent and of said combustible powder substantially uniformly distributed along the length of said device and being so constructed and arranged that, upon burning, it will release the vapor of said chemical agent in uniform amounts per unit of length of the device being burned.

2. A toxic vapor producing device in accordance with claim 1, wherein said toxic vapor producing material is uniformly disposed along said device, so as to provide a definite predetermined amount of such material per unit of length of said device, and wherein said combustible powder is also substantially uniformly disposed along the length of said device, so as to provide definite and controlled production of a predetermined concentration of particles of said toxic vapor of a predetermined average size upon the burning of said combustible powder.

3. A toxic vapor producing device in accordance with claim 1, wherein said toxic vapor producing material comprises an insecticide having as its active ingredient, 2-2 bis (para chloro phenyl) trichlorethane.

4. A toxic vapor producing device in accordance with claim 1, wherein said toxic vapor producing material comprises an insecticide having as its active ingredient, the gamma isomer of benzene hexachloride.

5. A vapor producing device of continuous length, comprising a plurality of central, substantially parallel filaments, each coated with an oxygen-sufficient combustible powder, a normally solid, active organic chemical agent which is capable of affecting living things and which is volatilizable as such by heat so disposed in respect to said combustible powder as to be volatilized upon the combustion of said powder, and means for holding and confining said coated filaments in the form of a cord, said device being so constructed and arranged that upon burning, it will release the vapor of said active chemical agent in uniform amounts per unit of length of the device being burned.

6. A vapor producing device of continuous length, comprising a plurality of central, substantially parallel filaments, each coated with an oxygen-sufficient combustible powder, at least one similar filament coated with an active organic chemical agent which is capable of affecting living things and which is volatilizable as such by heat, and means arranged for holding and confining said coated filaments in the form of a cord, said device being so constructed and arranged that upon burning, it will release the vapor of said active chemical agent in uniform amounts per unit of length of the device being burned.

7. A vapor producing device of continuous length, comprising a plurality of substantially parallel central filaments, each coated with an oxygen-sufficient combustible powder, an active organic chemical agent which is capable of affecting living things and which is volatilizable as such by heat so disposed as to be vaporized at the temperature attained thereby upon the combustion of said powder, and a plurality of reversely wound, helically disposed filaments for binding said coated filaments into a cord-like form, said device being so constructed and arranged that upon burning, it will release the vapor of said active chemical agent in uniform amounts per unit of length of the device being burned.

8. A vapor producing device of continuous length, comprising a central core of an oxygen-sufficient combustible powder, a layer of textile material surrounding and enclosing said core, an annular layer surrounding said textile layer and including an active organic chemical agent which is capable of affecting living things and which is volatilizable as such by heat at the temperatures attained thereby upon the combustion of said powder, a next outer layer comprising filamentary textile material surrounding and enveloping the layer including said active chemical agent, and an outermost coating layer of a fusible moisture-resistant material, said device being so constructed and arranged that, upon burning, it will release the vapor of said chemical agent in uniform amounts per unit of length of the device being burned.

9. A vapor producing device of continuous length, comprising a plurality of substantially parallel filaments, each coated with an oxygen-sufficient combustible composition, a plurality of reversely wound, helically disposed filaments for binding said coated filaments into a cord-like form, and an active organic chemical agent which is capable of affecting living things and which is volatilizable as such by heat coated upon said reversely wound helical filaments, said device being so constructed and arranged that, upon burning, it will release the vapor of said chemical agent in uniform amounts per unit of length of the device being burned.

10. A vapor producing device of continuous length, comprising a plurality of substantially parallel filaments, each coated with an oxygen-sufficient combustible composition, a coating of fusible material completely surrounding said coated filaments, a plurality of reversely wound, helically disposed filaments wound about said coating for binding the aforesaid elements into a cord-like form, and an active organic chemical agent which is capable of affecting living things and which is volatilizable as such by heat coated upon said reversely wound helical filaments, said device being so constructed and arranged that, upon burning, it will release the vapor of said chemical agent in uniform amounts per unit of length of the device being burned.

11. A vapor producing device in accordance with claim 10, wherein said coating of fusible material is formed as a tape disposed about the group of coated filaments with the edges of the tape overlapping and sealed together to provide a complete sheath about said coated filaments.

12. A vapor producing device in accordance with claim 10, wherein said coating of fusible material is formed as a tape disposed longitudinally of the device with its edges overlapping and sealed together in a longitudinally directed seam, to provide a complete sheath about said coated filaments.

DAVID E. PEARSALL.

REFERENCES CITED

The following references are of record in the file of this patent:

UNITED STATES PATENTS

| Number | Name | Date |
|---|---|---|
| 240,384 | Carey | Apr. 19, 1881 |
| 487,173 | Campbell | Nov. 29, 1892 |
| 1,162,682 | Cherry | Nov. 30, 1915 |
| 2,071,171 | McConnell | Feb. 16, 1937 |
| 2,127,975 | Kemp | Aug. 23, 1938 |
| 2,239,051 | Pearsall | Apr. 22, 1941 |
| 2,239,052 | Pearsall | Apr. 22, 1941 |